(12) United States Patent
Harayama et al.

(10) Patent No.: US 10,181,588 B2
(45) Date of Patent: Jan. 15, 2019

(54) BATTERY

(71) Applicants: Takashi Harayama, Toyota (JP);
Kazuyuki Kusama, Nagoya (JP)

(72) Inventors: Takashi Harayama, Toyota (JP);
Kazuyuki Kusama, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 12 days.

(21) Appl. No.: 14/409,770

(22) PCT Filed: Mar. 21, 2013

(86) PCT No.: PCT/JP2013/057961
§ 371 (c)(1),
(2) Date: Dec. 19, 2014

(87) PCT Pub. No.: WO2014/002543
PCT Pub. Date: Jan. 3, 2014

(65) Prior Publication Data
US 2015/0155532 A1 Jun. 4, 2015

(30) Foreign Application Priority Data
Jun. 25, 2012 (JP) .................................. 2012-141755

(51) Int. Cl.
*H01M 2/08* (2006.01)
*H01M 2/06* (2006.01)
(Continued)

(52) U.S. Cl.
CPC ............... *H01M 2/08* (2013.01); *H01M 2/06* (2013.01); *H01M 2/22* (2013.01); *H01M 2/30* (2013.01)

(58) Field of Classification Search
CPC ............ H01M 2/06; H01M 2/08; H01M 2/22; H01M 2/30
See application file for complete search history.

(56) References Cited

U.S. PATENT DOCUMENTS 6,159,630 A * 12/2000 Wyser ...................... H01G 9/12
429/129
2011/0052977 A1 3/2011 Kurata et al.
(Continued)

FOREIGN PATENT DOCUMENTS

CN 102 157712 A 8/2011
JP 2000-311664 A 11/2000
(Continued)

*Primary Examiner* — Barbara L Gilliam
*Assistant Examiner* — Adam A Arciero
(74) *Attorney, Agent, or Firm* — Hunton Andrews Kurth LLP

(57) ABSTRACT

A battery is provided with a lid member that closes a case, a collector terminal member having an insert-through part, an insulator that electrically insulates the lid member and the collector terminal member, and a gasket that provides a seal between the lid member and the collector terminal member. The lid member has a protrusion protruding downward in the vertical direction from the bottom. A gasket is in the same position as the protruding section in an inside-outside direction, which is perpendicular to the vertical direction, and has a sealing part pressed by the protruding section. At least one gap exists in the vicinity of the seal section in a different position to the seal section in the inside-outside direction, and at least portions of the gaps are enclosed by the gasket and the collector terminal member.

6 Claims, 6 Drawing Sheets

(51) Int. Cl.
*H01M 2/22* (2006.01)
*H01M 2/30* (2006.01)

(56) References Cited

U.S. PATENT DOCUMENTS

| | | |
|---|---|---|
| 2011/0200870 A1 | 8/2011 | Kim et al. |
| 2012/0021262 A1* | 1/2012 | Kusama .............. H01M 2/1241 |
| | | 429/56 |
| 2012/0214053 A1* | 8/2012 | Kim ........................ H01M 2/04 |
| | | 429/182 |
| 2013/0071728 A1 | 3/2013 | Shibanuma et al. |

FOREIGN PATENT DOCUMENTS

| | | |
|---|---|---|
| JP | 2005-056649 A | 3/2005 |
| JP | 2011-023235 A | 2/2011 |
| JP | 2011-048976 A | 3/2011 |
| JP | 2011-233399 A | 11/2011 |
| JP | 2012-028246 A | 2/2012 |

\* cited by examiner

BATTERY

CROSS-REFERENCE TO RELATED APPLICATIONS

This is a US national phase application based on the PCT International Patent Application No. PCT/JP2013/057961 filed on Mar. 21, 2013, and claiming the priority of Japanese Patent Application No. 2012-141755 filed on Jun. 25, 2012, the entire contents of which are incorporated herein by reference.

TECHNICAL FIELD

The present invention relates to a battery in which a power generating element is enclosed in a case and an opening of the case is closed by a lid member. More particularly, the present invention relates to a technique on a sealing structure for sealing the lid member and a collector terminal member by interposing a gasket therebetween, the collector terminal being provided to be electrically connected to the power generating element and penetrate through the lid member.

BACKGROUND ART

Batteries are used in various fields, for example, electronic devices such as a mobile phone and a personal computer, vehicles such as a hybrid car and an electric car. For example, a battery used in a vehicle field is configured such that a power generating element is enclosed in a casing of a can body and a lid member is welded to an opening of the casing to seal the opening. The lid member is formed with a through hole penetrating therethrough in a thickness direction of the lid member to allow an insert-through part of a collector terminal member electrically connected to the power generating element extends out through the through hole.

A method for fixing the collector terminal member to the lid member is disclosed as a technique, for example disclosed in Patent Document 1, that an insert-through part of a cylindrical collector terminal member is inserted through openings formed one each in an external connecting terminal, an insulator, the lid member, and a gasket, and an upper end of the insert-through part is deformed or riveted to extend radially outward relative to the center axis of the insert-through part, providing temporary joining, and further the extended upper end of the insert-through part and an upper surface of the external connecting terminal are welded and fixed to each other. In the battery disclosed in Patent Document 1, the gasket seals between the lid member and the collector terminal member to suppress gas leakage from the opening of the lid member.

RELATED ART DOCUMENTS

Patent Documents

Patent Document 1: JP-A-2012-28246

SUMMARY OF INVENTION

Problems to be Solved by the Invention

In order to further enhance the sealing strength for a collector terminal member and its surrounding parts, recently, a noticeable sealing structure is configured such that a protrusion protruding in an axial direction (corresponding to a deforming direction) of an insert-through part is provided on a contact surface of a lid member with a gasket to compress a part of the gasket. The sealing structure in which a part of the gasket includes a portion having a high-compression rate (hereinafter, referred to as a "sealing part") have the following problems.

Specifically, during charge and discharge, a battery temporarily comes to a high temperature state. When the lid member and the collector terminal member are made of metal such as aluminum having a high linear expansion coefficient and similarly the gasket is made of resin such as PFA (perfluoroalkyl vinyl ether copolymer) having a high linear coefficient, the gasket will be compressed by expansion action of the above members at high temperatures. This results in a more highly compressed state of a sealing part of the gasket, which may cause cracks in the gasket.

The present invention has been made to solve the above problems and has a purpose to provide a battery with a sealing structure including a sealing part of a high compression rate in a gasket to prevent generation of cracks in the gasket at high temperatures.

Means of Solving the Problems

To achieve the above purpose, one aspect of the invention provides a battery including: a power generating element; a case having an opening and enclosing the power generating element; a lid member welded to the opening of the case to close the opening; a collector terminal member including a collector having one end electrically connected to the power generating element and the other end facing the lid member, and an insert-through part having one end electrically connected to the collector and the other end penetrating through the lid member in a vertical direction corresponding to a thickness direction of the lid member to extend out of the lid member, the other end of the insert-through part including a deformed part extended radially by deforming and electrically connected to an outer connecting terminal; an insulator placed in contact with an upper surface of the lid member to electrically insulate the lid member and the collector terminal member; and a gasket placed in contact with a lower surface of the lid member to seal between the lid member and the collector terminal member, wherein the lid member includes a protrusion protruding downward from a lower surface in the vertical direction, the gasket includes a sealing part located in the same position as the protrusion in an inside-outside direction corresponding to a direction perpendicular to the vertical direction, the sealing part being in pressure contact with the protrusion, and at least one gap, at least a part of which is surrounded by the gasket and the collector terminal member, is present in a position different from the sealing part in the inside-outside direction and in the vicinity of the sealing part.

When the battery of the above aspect is in a high temperature state, the gasket and the collector terminal member will expand. At that time, in the above battery including a gap in the vicinity of the sealing part of the gasket, the gap can receive at least part of an expanded portion. This can reduce a possibility that the sealing part of the gasket is excessively compressed. Thus, it is to be expected to suppress defects such as cracks which are apt to occur in the gasket. The gap may be formed on either or both of more inside or outside than the sealing part. A suitable material of the gasket is fluorine resin (e.g., PFT).

Furthermore, it is preferable that at least one gap is interposed on a side closer to the insert-through part than the sealing part in the inside-outside direction and between the insulator and the insert-through part of the collector. As the battery rises in temperature, the collector terminal member and others will expand. Or during deforming or riveting in a manufacturing process, the insert-through part of the collector terminal member will radially extend to some degree. When the collector terminal member and the insulator are adjacent, their expansion and radial extension may cause the collector terminal member to press the insulator. Large pressing force on the insulator may cause generation of cracks in the insulator. Thus, the gap(s) is formed in the vicinity of the insulator, so that it is expected to suppress defects that cracks are generated in the insulator.

Furthermore, it is preferable that the gasket fills between the lid member and the collector in the inside-outside direction and is interposed between the insulator and the insert-through part of the collector, and the gap interposed between the insulator and the insert-through part of the collector is located above the gasket interposed between the insulator and the insert-through part of the collector. It is expected that the gasket interposed in the vicinity of the insulator can reduce compression by the collector against the insulator. Since the gap(s) is present above the gasket placed in the vicinity of the insulator, the gap receives an expanded portion of the gasket extending upward in the corresponding position.

Furthermore, it is preferable that the insert-through part of the collector has a columnar shape, and the gasket interposed between the insulator and the insert-through part of the collector is placed over an entire outer circumference of the insert-through part of the collector. When the insulator and the collector are to be assembled, the gasket is interposed over the entire circumference and it can suppress positional displacement (axis misalignment) between the insulator and the collector.

Furthermore, it is preferable that the gap is provided in two places on a side closer to the insert-through part than the sealing part and on an opposite side to the insert-through part in the inside-outside direction. Since the gaps are interposed on both of the terminal side and the opposite side thereto, the expanded portion of the gasket even if expands in either direction of the inside-outside direction can be reliably received. Accordingly, it is possible to reduce the possibility that the sealing part of the gasket is excessively compressed.

Another aspect of the invention provides a battery including: a power generating element; a case having an opening and enclosing the power generating element; a lid member welded to the opening of the case to close the opening; a collector terminal member including a collector having one end electrically connected to the power generating element and the other end facing the lid member, and an insert-through part having one end electrically connected to the collector and the other end penetrating through the lid member in a vertical direction corresponding to a thickness direction of the lid member to extend out of the lid member, the other end of the insert-through part including a deformed part extended radially by deforming and electrically connected to an outer connecting terminal; an insulator placed in contact with an upper surface of the lid member to electrically insulate the lid member and the collector terminal member; and a gasket placed in contact with a lower surface of the lid member to seal between the lid member and the collector terminal member, wherein the lid member includes a protrusion protruding downward from a lower surface in the vertical direction, the gasket fills between the lid member and the collector terminal member in an inside-outside direction corresponding to a direction perpendicular to the vertical direction, and part of the gasket is interposed between the insulator and the collector terminal member.

Effects of the Invention

According to the above aspect of the present configuration, it is possible to achieve a battery with a sealing structure including a sealing part of a high compression rate in a gasket to thereby suppress generation of cracks in the gasket at high temperatures.

MODE FOR CARRYING OUT THE INVENTION

A detailed description of a preferred embodiment of a battery embodying the present invention will now be given referring to the accompanying drawings. In the following embodiment, the present invention is applied to a lithium ion secondary battery to be mounted in a hybrid car.

(Structure of Battery)

Figure 1:
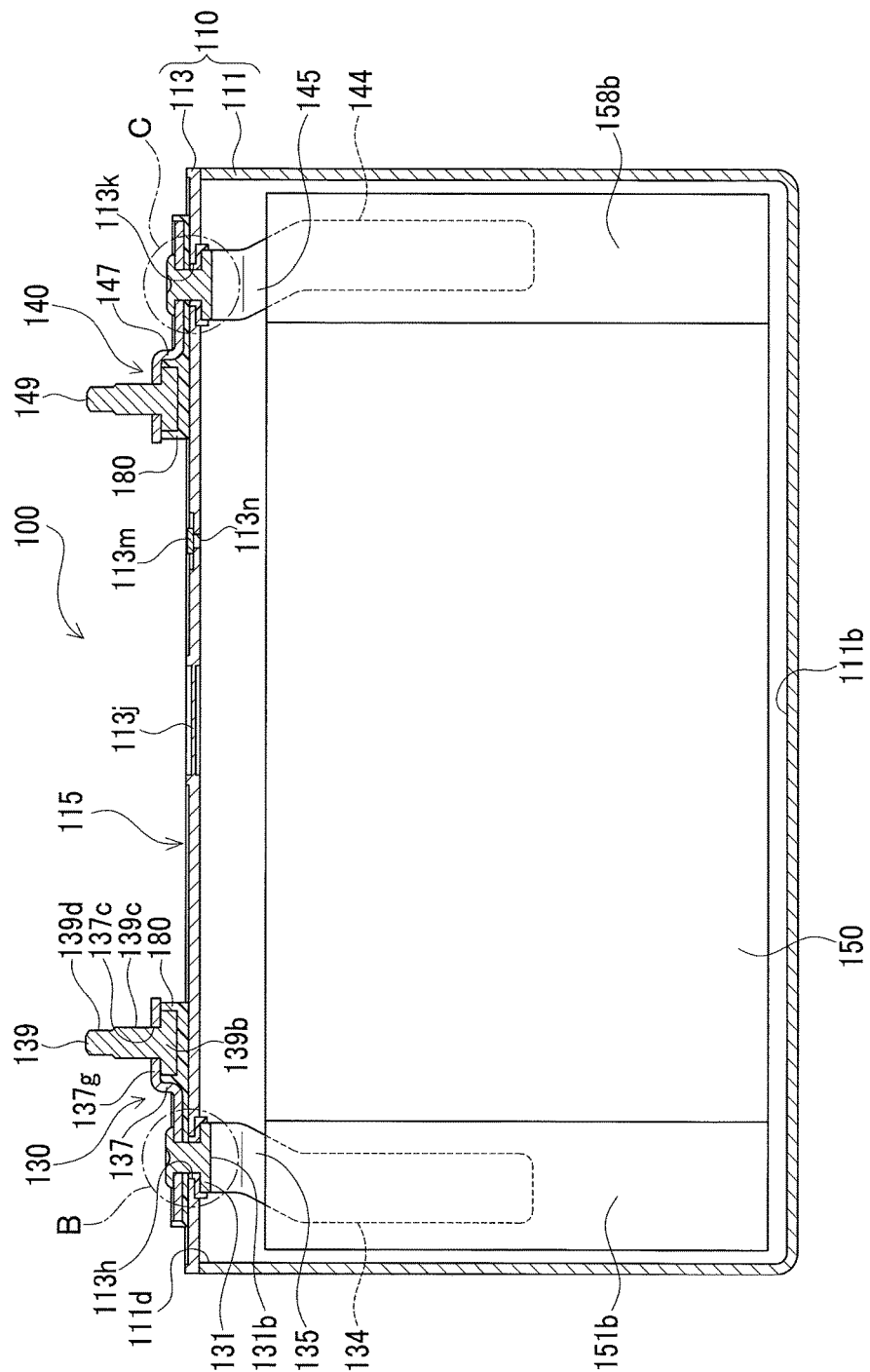
FIG. 1 is a cross sectional view of a battery in an embodiment.
Figure 2:
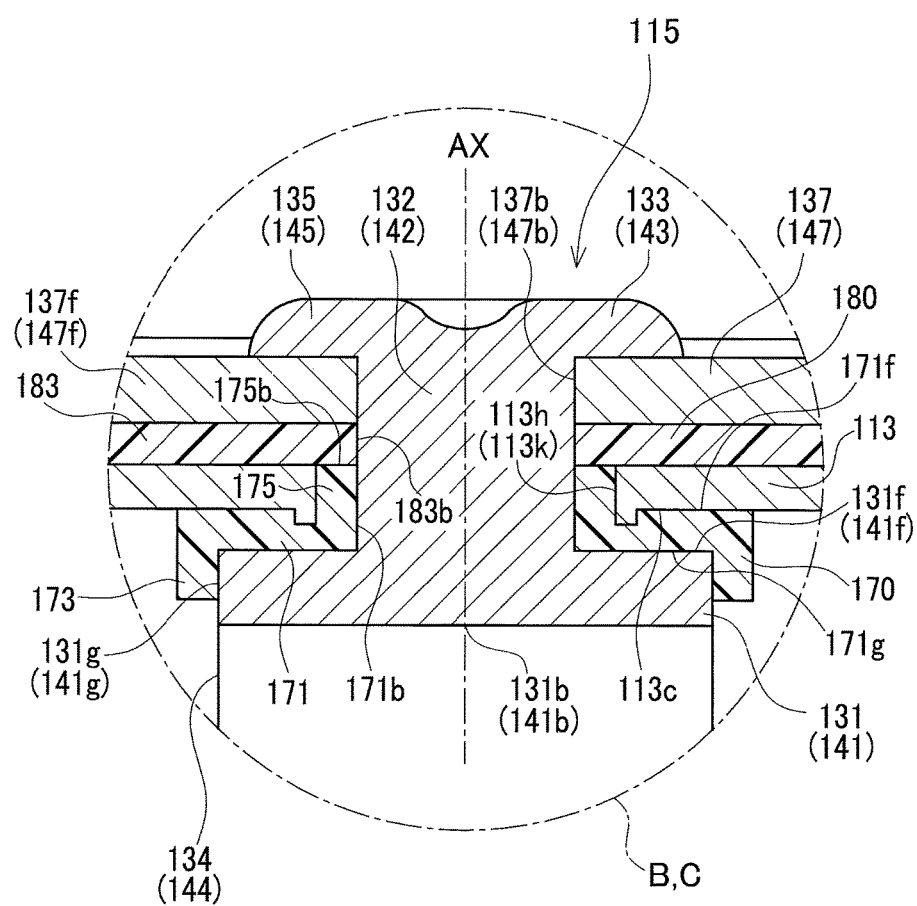
FIG. 2 is an enlarged view of a section B and a section C in FIG. 1.
Figure 3:
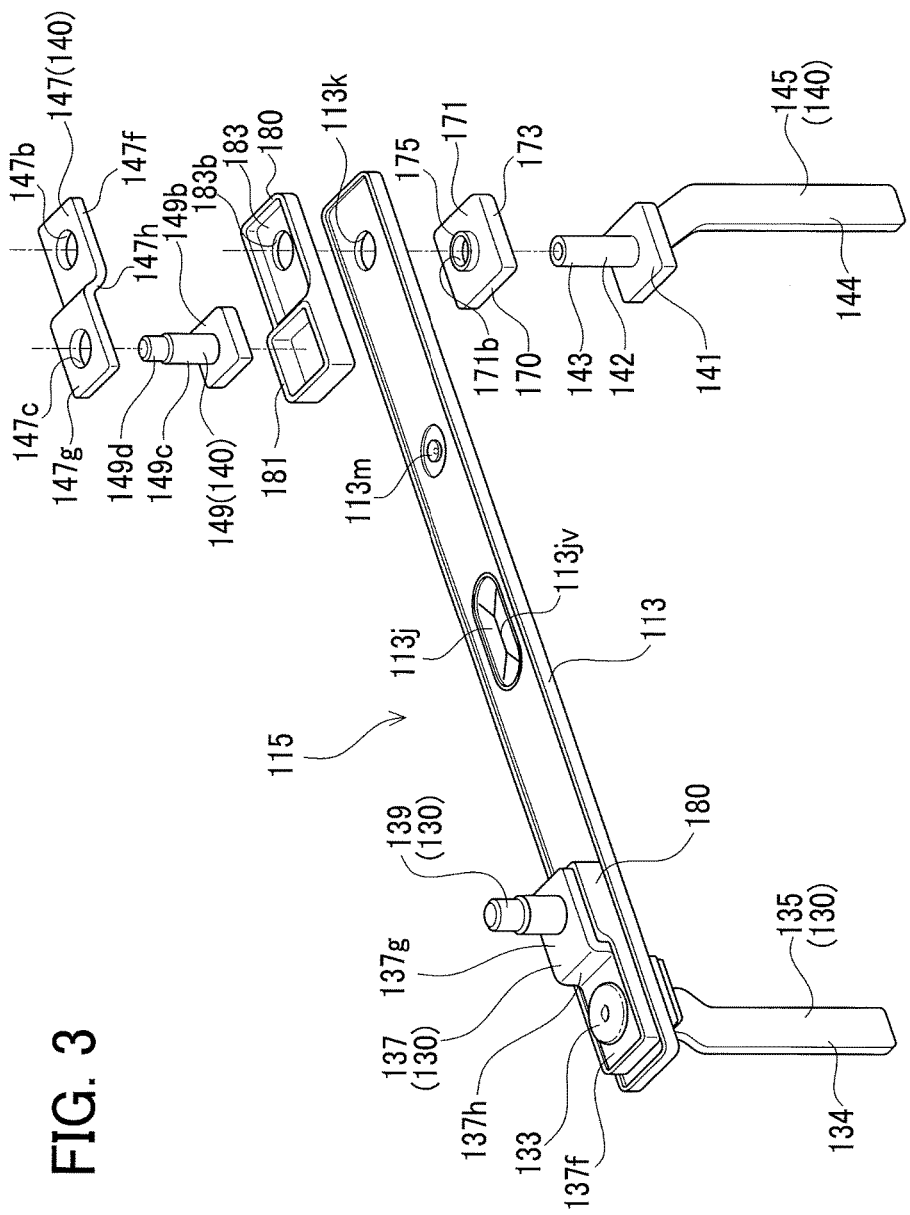
FIG. 3 is a view showing a lid subassembly in the embodiment.

FIG. 1 is a cross sectional view of a battery 100 in the present embodiment. FIG. 2 is an enlarge view of a section B and a section C in FIG. 1. Components in the section C, different from those in the section B, are assigned parenthesized reference signs in FIG. 2. FIG. 3 is an exploded perspective view of part of a lid subassembly 115 to be assembled in the battery 100 shown in FIG. 1.

The battery 100 of the present embodiment is a lithium ion secondary battery including, as shown in FIG. 1, a case body 111 of a rectangular box shape having an opening 111d, and an electrode body 150 enclosed in the case body 111. The battery 100 further includes a plate-shaped case lid 113 that closes the opening 111d of the case body 111. The case body 111 and the case lid 113 are integrally welded to each other, forming a battery case 110.

The case lid 113 is made of metal (aluminum in the present embodiment) in a rectangular plate-like shape and is formed with circular through holes 113h, 113k each penetrating through the case lid 113 at both ends in a longitudinal direction thereof (a lateral direction in FIG. 1). The case lid 113 is further provided, at its center in the longitudinal direction, with a safety valve 113j. This safety valve 113j is formed integral with the case lid 113 to constitute a part of the case lid 113.

The safety valve 113j is formed to be thinner than other portions of the case lid 113 and is formed, on its upper surface, with a groove 113jv (see FIG. 3). Specifically, the groove 113jv ruptures when the internal pressure reaches the predetermined pressure, thereby allowing gas in the battery case 110 to release out.

The case lid 113 is formed, between the safety valve 113j and the through hole 113k, with a liquid inlet 113n (see FIG. 1) through which electrolyte (not shown) is poured into the battery case 110. In the completed battery 100, this liquid inlet 113n is sealed with a plug 113m.

The electrode body 150 is a flattened wound electrode body formed of a positive electrode sheet, a negative electrode sheet, and separators, which are wound together into a flattened shape. The positive electrode sheet includes a positive substrate made of aluminum foil and positive mixture layers placed each on part of each surface of this substrate. The positive mixture layer contains positive active material, electrically conductive material made of acetylene black, and PVDF (binder). The negative electrode sheet includes a negative substrate made of copper foil and negative mixture layers placed each on part of each surface of this substrate. The negative mixture layer contains negative active material, SBR (binder), and CMC (thickener). The separators made of porous polypropylene resin sheets. The above materials of the positive electrode sheet, positive active material, negative electrode sheet, negative active material, and separators are mere examples and may be appropriately selected from ones generally used for lithium secondary batteries.

Of the positive substrate of the positive electrode sheet (the negative substrate of the negative electrode sheet), a portion coated with the positive mixture layer (the negative mixture layer) is referred to as a mixture coated part, while a portion not coated with the positive mixture layer (the negative mixture layer) is referred to as a mixture uncoated part. The electrode body 150 is configured such that the mixture uncoated part 151b of the positive electrode sheet is exposed at one end in a winding axis direction (the lateral direction in FIG. 1) and a mixture uncoated part 158b of the negative electrode sheet is exposed at the other end.

The battery 100 further includes an electrode terminal unit (a positive terminal unit 130 and a negative terminal unit 140) that is connected to the electrode body 150 in the case body 111 and extends out respectively through the through hole 113h or 113k of the case lid 113.

The positive terminal unit 130 consists of a positive collector terminal member 135, a positive outer terminal member 137, and a positive fastening member 139 (bolt) (see FIGS. 1 and 3). The collector terminal member 135 is made of metal (aluminum or aluminum in the present embodiment) having one end connected to the electrode body 150 and the other end extending out through the through hole 113h of the case lid 113. The outer terminal member 137 is made of metal, placed on the case lid 113 (outside the battery case 110) and electrically connected to the collector terminal member 135 outside the battery case 110. The fastening member 139 is made of metal, placed on the case lid 113 (outside the battery case 110) and electrically connected to the outer terminal member 137.

To be concrete, the positive collector terminal member 135 includes a collector head portion 131, an insert-through part 132, and a collector body 134, and a deformed part 133 (see FIGS. 1 to 3). The head portion 131 has a rectangular plate-like shape and located inside the case body 111. The insert-through part 132 has a columnar shape protruding from an upper surface 131f of the head portion 131 and penetrating through the through hole 113h of the case lid 113. The deformed part 133 is a portion continuous with an upper end of the insert-through part 132 and deformed or riveted (an upper end portion of the insert-through part 132 is deformed to extend radially outward) into a circular disc shape, and electrically connected to the positive outer terminal member 137. The collector body 134 extends from a lower surface 131b of the head portion 131 toward a bottom 111b of the case body 111 and is welded to the mixture uncoated part 151b of the positive electrode sheet of the electrode body 150. Accordingly, the positive collector terminal member 135 and the electrode body 150 are electrically and mechanically connected to each other.

The positive outer terminal member 137 has a nearly Z shape in side view. This terminal member 137 includes a fixed part 137f fixed by the deformed part 133, a connection part 137g connected to the fastening member 139, and a joint part 137h joining the fixed part 137f and the connection part 137g. The fixed part 137f is formed with a through hole 137b penetrating therethrough. In this through hole 137b, the insert-through part 132 of the positive collector terminal member 135 is inserted. The connection part 137g is also formed with a through hole 137c penetrating therethrough.

The positive fastening member 139 is a metal bolt that includes a rectangular plate-shaped head portion 139b and a columnar shaft portion 139c. The shaft portion 139c includes a distal end portion formed with screw threads 139d. The shaft portion 139c of the fastening member 139 is inserted in the through hole 137c of the positive outer terminal member 137.

The negative terminal unit 140 consists of a negative collector terminal member 145, a negative outer terminal member 147, and a negative fastening member 149 (bolt) (see FIGS. 1 and 3). The collector terminal member 145 is made of metal (copper in the present embodiment) having one end connected to the electrode body 150 and the other end extending out through the through hole 113k of the case lid 113. The outer external terminal 147 is made of metal, placed on the case lid 113 (outside the battery case 110) and electrically connected to the collector terminal member 145. The fastening member 149 is made of metal, placed on the case lid 113 (outside the battery case 110) and electrically connected to the outer terminal member 147.

To be concrete, the negative collector terminal member 145 includes a collector head portion 141, an insert-through part 142, a collector body 144, and a deformed part 143 (see FIGS. 1 to 3). The head portion 141 has a rectangular plate-like shape and located inside the case body 111. The insert-through part 142 has a columnar shape protruding from an upper surface 141f of the head portion 141 and penetrating through the through hole 113k of the case lid 113. The deformed part 143 is a portion continuous with an upper end of the insert-through part 142 and riveted (an upper end portion of the insert-through part 142 is deformed to extend radially outward) into a circular disc shape, and electrically connected to the positive outer terminal member 147. The collector body 144 extends from a lower surface 141b of the collector head portion 141 toward the bottom 111b of the case body 111 and is welded to the mixture uncoated part 158b of the negative electrode sheet of the electrode body 150. Accordingly, the negative collector terminal member 145 and the electrode body 150 are electrically and mechanically connected to each other.

The negative outer terminal member 147 has a nearly Z shape in side view. This terminal member 147 includes a fixed part 147f fixed by the deformed part 143, a connection part 147g connected to the fastening member 149, and a joint part 147h joining the fixed part 147f and the connection part 147g. The fixed part 147f is formed with a through hole 147b penetrating therethrough. In this through hole 147b, the insert-through part 142 of the negative collector terminal member 145 is inserted. The connection part 147g is also formed with a through hole 147c penetrating therethrough.

The negative fastening member 149 is a metal bolt that includes a rectangular plate-shaped head portion 149b and a columnar shaft portion 149c. This shaft portion 149c includes a distal end portion formed with screw threads 149d. The shaft portion 149c of the fastening member 149 is inserted in the through hole 147c of the negative outer terminal member 147.

The battery 100 further includes a gasket 170 interposed between the positive terminal unit 130 (i.e., the positive collector terminal member 135) and the case lid 113 to electrically insulate them from each other. Another gasket member 170 is also interposed between the negative terminal unit 140 (i.e., the negative collector terminal member 145) and the case lid 113.

To be concrete, each gasket 170 is made of electrically insulating resin (PFA in the present embodiment) and includes a body part 171, an outer burring portion 173, and an inner burring portion 175 (see FIGS. 2 and 3). The body part 171 has a rectangular flat-plate shape formed, at its center, with a circular through hole 171b in which the insert-through part 132 (the insert-through part 142) of the positive terminal unit 130 (the negative terminal unit 140) is inserted. The body part 171 is interposed between the upper surface 131f (the upper surface 141f) of the collector head portion 131 (the collector head portion 141) of the positive terminal unit 130 (the negative terminal unit 140) and the lower surface 113c of the case lid 113.

The outer burring portion 173 is rectangular-annular side wall located on the circumferential edge of the body part 171 and protruding from the lower surface 171g of the body part 171. This outer burring portion 173 surrounds an outer side surface 131g (an outer side surface 141g) of the collector head portion 131 (the collector head portion 141). The outer burring portion 173 ensures a creepage distance between the lower surface 113c of the case lid 113 and the outer side surface 131g (the outer side surface 141g) of the collector head portion 131 (the collector head portion 141).

The inner burring portion 175 is of a cylindrical shape protruding from an upper surface 171f of the body part 171 and placed in the through hole 113h (the through hole 113k) of the case lid 113. In a cylindrical hole of this inner burring portion 175, the insert-through part 132 of the positive terminal unit 130 (the insert-through part 142 of the negative terminal unit 140) is inserted. The inner burring portion 175 provides electrical insulation between the case lid 113 and the insert-through part 132 of the positive terminal unit 130 (the insert-through part 142 of the negative terminal unit 140).

Furthermore, the battery 100 includes an insulator 180 made of electrically insulating resin and is placed on the case lid 113. The insulator 180 is interposed between the positive terminal unit 130 (i.e., the positive outer terminal member 137 and the positive fastening member 139) and the case lid 130 and provides electrical insulation between them. Another insulator 180 is also interposed between the negative terminal unit 140 (i.e., the negative outer terminal member 147 and the negative fastening member 149) and the case lid 113.

Concretely, the insulator 180 includes a head placing part 181 in which the head portion 139b of the positive fastening member 139 (the head portion 149b of the negative fastening member 149) is placed and a fastening placing part 183 in which the fixed part 137f of the positive outer terminal member 137 (the fixed part 147f of the negative outer terminal member 147) is placed. The fastening placing part 183 is formed with a through hole 183b penetrating therethrough, in which the insert-through part 132 of the positive terminal unit 130 (the insert-through part 142 of the negative terminal unit 140) is inserted.

In the present embodiment, the case lid 113, the electrode terminal units (the positive terminal unit 130 and the negative terminal unit 140), the gaskets 170, 170, and the insulators 180, 180 constitute the lid subassembly 115. Specifically, the positive outer terminal member 137, the insulator 180, the case lid 113, and the gasket 170 are held and fixed between the deformed part 133 and the collector head portion 131 of the positive terminal unit 130, while the negative outer terminal member 147, the insulator 180, the case lid 113, and the gasket 170 are held and fixed between the deformed part 143 and the collector head portion 141 of the negative terminal unit 140. The thus integrally assembled components constitute the lid subassembly 115.

In the lid subassembly 115, the body part 171 of the gasket 170 is sandwiched between the collector head portion 131 (the collector head portion 141) of the positive terminal unit 130 (the negative terminal unit 140) and the lower surface 113c of the case lid 113 in an elastically compressed state in its own thickness direction (a vertical (up-down) direction in FIG. 2). The inner burring portion 175 of the gasket 170 is further elastically compressed in its own axis direction (the vertical direction in FIG. 2) and a distal end 175b is in close contact with the insulator 180.

(Configuration of Surrounding Parts of Sealing Part)

Figure 4:
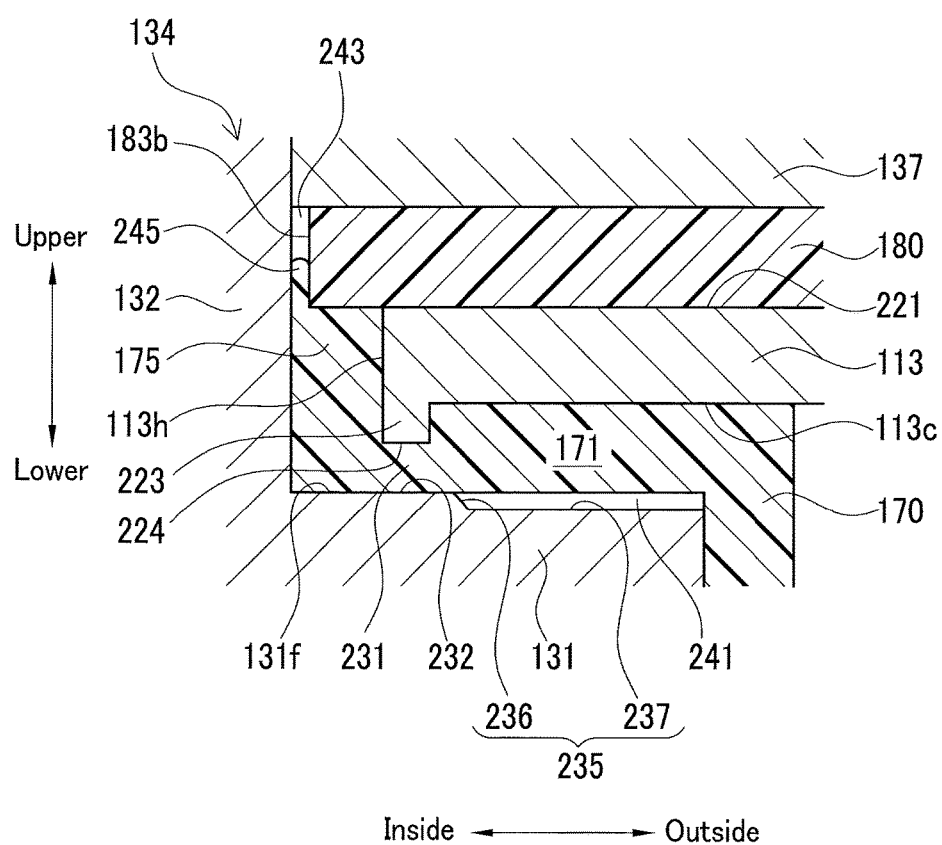
FIG. 4 is an explanatory enlarged view showing a gasket and its surrounding parts.

Next, a range fixed by deforming, or riveting, of the positive collector terminal member 135 will be further explained in detail referring to FIG. 4. FIG. 4 shows a part of the battery 100 at normal temperatures. The following explanation is made on only the positive terminal, but the same applies to the negative terminal.

As shown in FIG. 2, a plurality of components including the case lid 113 are sandwiched between the deformed part 133 and the collector head portion 131 of the positive collector terminal member 135. The deforming direction of the deformed part 133 corresponds to the thickness direction of the case lid 113. Hereinafter, this direction is simply referred to as a vertical direction. The deformed part 133 is formed above the case lid 113 and outside the battery 100 as shown in FIG. 1.

Overlapping portions of the components fixed by the deformed part 133 are shown in a more enlarged view in FIG. 4. A vertical direction in FIG. 4 corresponds to the aforementioned vertical direction. At a left end in FIG. 4, a part of the insert-through part 132 of the positive collector terminal member 135 appears. The center axis of the insert-through part 132 is a center axis AX as shown in FIG. 2. A direction perpendicular to the center axis AX and the insert-through part 132 is referred to as an inside-outside direction. Hereinafter, a side close to the insert-through part 132 is the inside while a side far from the insert-through part 132 is the outside. In FIG. 4, a left side in the figure is the inside, and a right side in the figure is the outside.

As shown in FIG. 4, on the outer side than the insert-through part 132, the positive outer terminal member 137, the insulator 180, the case lid 113, the gasket 170, and the collector head portion 131 are stacked in this order from above. A lid upper surface 221 which is an upper side surface of the case lid 113 is pressed against the insulator 180. The lower surface 113c which is a lower side surface of the case lid 113 is pressed against the gasket 170.

The lower surface 113c of the case lid 113 is formed with a protrusion 223 protruding downward. This protrusion 223 is formed on an innermost side of the case lid 113 as shown in FIG. 4. The protrusion 223 is formed extending downward from the inner wall of the through hole 113h of the case lid 113 and over the entire circumference, taking a nearly cylindrical shape. At least a protruding lower surface 224 of the protrusion 223 is in contact with the gasket 170 to compress the gasket 170. This lower surface 224 is a surface, perpendicular to the vertical direction, of a lower tip of the protrusion 223.

Of the gasket 170, an annular range pressed by the lower surface 224 of the protrusion 223 is a sealing part 231. This sealing part 231 reliably provides a seal over the entire circumference of the through hole 113h of the case lid 113.

Of the upper surface 131f of the collector head portion 131, a range facing at least a part of the lower surface 224 of the protrusion 223 is a seal facing portion 232 that presses against the sealing part 231 of the gasket 170 in cooperation with the protrusion 223. Specifically, the protrusion 223, the sealing part 231, and the seal facing part 232 are located in one place in the inside-outside direction. The gasket 170 is sandwiched, at the sealing part 231, between the protrusion 223 and the seal facing part 232 in the vertical direction and is highly compressed as compared with the surrounding parts of the sealing part 231.

The upper surface 131f of the collector head portion 131 is formed with a recess 235 more outside than the seal facing part 232 as shown in FIG. 4. The upper surface of the recess 235 includes a tapered surface 236 located more outside than the seal facing part 232 and splayed out and a horizontal surface 237 continuous with the outside of the tapered surface 236. The horizontal surface 237 is a surface perpendicular to the vertical direction. The horizontal surface 237 is formed continuous with an outer end of the collector head portion 131 in FIG. 4, but may be formed partway.

On the other hand, the body part 171 of the gasket 170 has a rectangular flat shape as mentioned above (see FIG. 3) and the lower surface of the body part 171 is planar in a non-compressed state. Of the gasket 170, only the sealing part 231 is in a highly compressed state. Thus, in a rage above the recess 235, the lower surface of the body part 171 of the gasket 170 is almost planar. This generates a gap 241 between the recess 235 and the gasket 170. In other words, at least part of the upper surface of the recess 235 is out of contact with the lower surface of the gasket 170. This gap 241 is just a space and is not particularly filled with something.

Furthermore, as shown in FIG. 4, the inner diameter of the through hole 113h of the case lid 113 is larger than the outer diameter of the insert-through part 132. Between the through hole 113h of the case lid 113 and the insert-through part 132 in the inside-outside direction, the inner burring portion 175 of the gasket 170 is interposed. Thus, the case lid 113 and the insert-through part 132 are insulated from each other by the inner burring portion 175. The inner burring portion 175 is located more inside than the sealing part 231 of the gasket 170.

Above the inner burring portion 175, the insulator 180 is placed. The inner diameter of the through hole 183b of the insulator 180 is slightly larger than the outer diameter of the insert-through part 132, thus forming a gap 243 between the insulator 180 and the insert-through part 132. The inner diameter of the through hole 183b of the insulator 180 is smaller than the inner diameter of the through hole 113h of the case lid 113, but larger than the inner diameter of the inner burring portion 175.

The gap 243 is present above the inner burring portion 175 and between the insulator 180 and the insert-through part 132, and is surrounded by these inner burring portion 175, insulator 180, and insert-through part 132. Above the gap 243, as shown in FIG. 4, the positive outer terminal member 137 is placed. The gap 243 is positioned more inside than the sealing part 231.

A part of the inner burring portion 175 of the gasket 170 enters in a lower area of the gap 234, forming a spacer part 245. This spacer part 245 is interposed over the entire circumference between the insert-through part 132 and the insulator 180. Accordingly, the insulator 180 is out of contact with the insert-through part 132. The gap 243 is also just a space and is not particularly filled with something.

The spacer part 245 is formed when the aforementioned deformed part 133 (see FIG. 2) is to be dammed or riveted, causing a part of the inner burring portion 175 to extend toward the gap 243. The gasket 170, before deforming, is not formed with any protrusion corresponding to the spacer part 245. However, a protrusion corresponding to the spacer part 245 may be formed in advance in the gasket 170.

The gasket 170 in the present embodiment is made of fluorine resin, or PFA, as mentioned above. The positive collector terminal member 135, the case lid 113, and the positive outer terminal member 137 are all made of aluminum or aluminum. The insulator 180 is made of PA66 (polyamide 66).

Both the aluminum and the PFA are materials with relatively high linear coefficients. The temperature of the battery 100 will rise to a certain degree in use and decrease when the use of the battery 100 is stopped. Accordingly, the positive collector terminal member 135, case lid 113, positive outer terminal member 137, and gasket 170 will repeatedly expand and constrict within certain degrees during use of the battery 100.

In the battery 100, even when each component expands, it is not preferable that the gasket 170 is in an over-compressed state. This is because if the gasket 170 is expressively compressed, cracks may be generated therein in some cases. In particular, the sealing part 231 initially highly compressed is likely to be excessively compressed. On the other hand, the gasket 170 is demanded for good sealing performance even when each component constricts.

Figure 5:
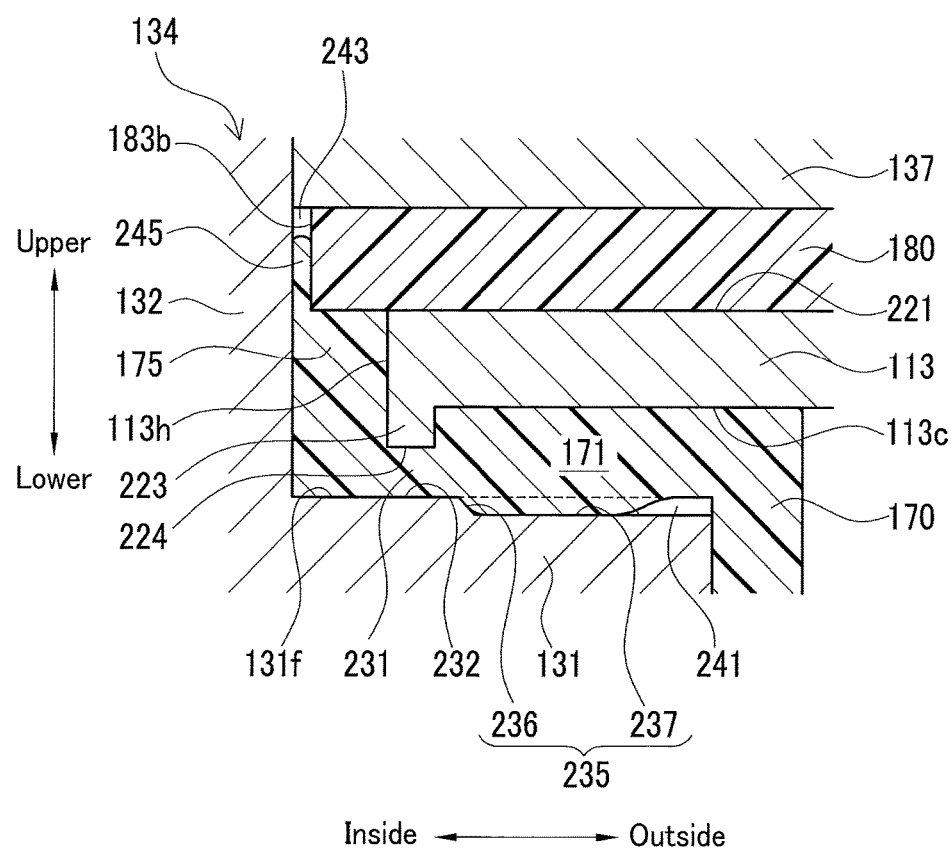
FIG. 5 is an explanatory enlarged view showing a gasket and its surrounding parts in a high temperature state.

The gasket 170 in the present embodiment faces the gap 241 in a place more outside than the sealing part 231 and faces the gap 243 in a place more inside than the sealing part 231. These gaps 241 and 243 are simple spaces. Therefore, expanded portions of each metal component and the gasket 170 can be received in the gaps 241 and 243. Thus, a part of the gasket 170 enters in the gaps 241 and 243 as shown in FIG. 5. FIG. 5 shows an example of the shape of the gasket 170 in a high temperature state.

When the temperature of the battery 100 rises, the gasket 170 allows the expanded portion more outside than the sealing part 231 to be absorbed by the gap 241 and the expanded portion more inside than the sealing part 231 to be absorbed by the gap 243 while maintaining the sealing performance of the sealing part 231. This can avoid the sealing part 231 of the gasket 170 from coming to an over-compressed state. Therefore, the gaps 241 and 243 are preferably designed with a dimension capable of absorbing a maximum expanded portion within a certain temperature range that the battery 100 is likely to reach.

In the battery 100 in the present embodiment configured as above, the expanded portions of the gasket 170 and other components during temperature rise can be received by the gaps 241 and 243. Thus, the gasket 170 does not come to the over-compressed state, so that cracks are very less likely to be caused. Since the sealing part 231 is kept in an appropriately compressed state even when the gasket 170 in the present embodiment expands and constricts, the good sealing performance can be maintained.

Next, manufacture of the battery 100 will be explained below. As described above, as part of a manufacturing process of the lid subassembly 115, there is a deforming step of radially extending the end portion of the positive collector terminal member 135 to form the deformed part 133. In this deforming step, the collector terminal member 135, gasket 170, case lid 113, insulator 180, positive fastening member 139, and positive outer terminal member 137 are stacked in this order from below as shown in FIG. 3, and then the upper end portion of the collector terminal member 135 is riveted or deformed.

In the deforming step, the other components are pressed in the vertical direction between the collector head portion 131 and the deformed part 133 and also the insert-through part 132 is extended outward to a certain degree. The insulator 180 of the present embodiment has the through hole 183b having the inner diameter larger than the outer diameter of the insert-through part 132 after deformed. In the deforming step, therefore, no outward force from the insert-through part 132 directly acts on the through hole 183b. Thus, the insulator 180 is prevented from becoming damaged in the deforming step.

When the outer diameter of the insert-through part 132 is smaller than the inner diameter of the through hole 183b of the insulator 180, the insulator 180 is not stably positioned. This may cause the insulator 180 to be fixed in a position with the center axis of the through hole 183b out of alignment with the center axis with the insert-through part 132.

In the battery 100 in the present embodiment, the spacer part 245 is formed of part of the gasket 170 entering over the entire circumference between the insulator 180 and the insert-through part 132. This prevents the interval or distance between the insulator 180 and the insert-through part 132 from varying in the circumferential direction. That is, the spacer part 245 functions to position the insulator 180 in a coaxial position with the insert-through part 132. This can achieve precise positioning of the insulator 180 in a radial direction.

In the battery 100 of the present embodiment, specifically, the spacer part 245 is interposed between the through hole 183b of the insulator 180 and the insert-through part 132, so that defects such as breakage and axis misalignment of the insulator 180 in the deforming step are less likely to occur. Since the gap 243 is provided above the spacer part 245, furthermore, an expanded portion of the spacer part 245 at high temperatures of the battery 100 can be received by the gap 243.

According to the battery 100 of the present embodiment as explained in detail above, the protrusion 223 of the case lid 113 and the sealing part 231 of the gasket 170 are in pressure contact with each other, so that the inside of the battery is sealed from the outside. Moreover, since the battery 100 includes the gap 241 more outside than the sealing part 231 and the gap 243 more inside than the sealing part 231, expanded portions of the gasket 170 due to temperature rise can be received in the gaps 241 and 243. Accordingly, the battery 100 with the sealing structure including the sealing part 231 of a high compression rate in the gasket 170 can be achieved as a battery 100 prevented from generation of cracks in the gasket 170 at high temperatures.

The above embodiment is a mere example and does not limit the scope of the invention. The present invention may be embodied in other specific forms without departing from the essential characteristics thereof. For instance, the present invention is applicable not only to the battery 100 for vehicle but also to batteries for home use.

In the above embodiment, the protrusion 223 is formed extending downward from the inner wall of the through hole 113h of the case lid 113, but is not limited thereto. The protrusion 223 may be formed as a protrusion projecting downward from a portion of the lower surface 113c located more outside than the inner wall.

In the above embodiment, the gaps are provided one each more outside (the gap 241) and more inside (the gap 243) than the sealing part 231, but not limited thereto. For instance, the gaps may be provided either one of the inside and the outside. However, the gaps provided on both sides are more preferable to absorb an expanded portion more inside than the sealing part 231 and an expanded portion more outside than the same. Furthermore, the gaps may be provided in many places in the inside-outside direction. In this case, it is preferable to arrange the gaps in view of the sealing performance. For example, the gaps 241 and 243 are each formed over the entire circumference, but they are not necessarily formed over the entire circumference. They may be formed as some gaps arranged in separate positions in the circumferential direction.

In the present embodiment, the spacer part 245 is formed over the entire circumference, but not limited thereto. For instance, point-like spacer parts may be provided in several places in the circumferential direction. In this case, they can receive the pressure between the insulator 180 and the insert-through part 132. It is however more preferable that the spacer parts are arranged in a balanced manner in the circumferential direction. If the spacer parts are provided over the entire circumference, a more reliable positioning effect can be obtained.

In the above embodiment, the recess 235 has the tapered surface 236. As an alternative, the tapered surface 26 may be replaced with a vertical surface to the horizontal surface 237. However, the tapered surface 236 is more preferable to allow the gasket 170 to easily follow the shape. As an alternative, a curved surface smoothly extending may be adopted instead of the tapered surface 236.

Figure 6:
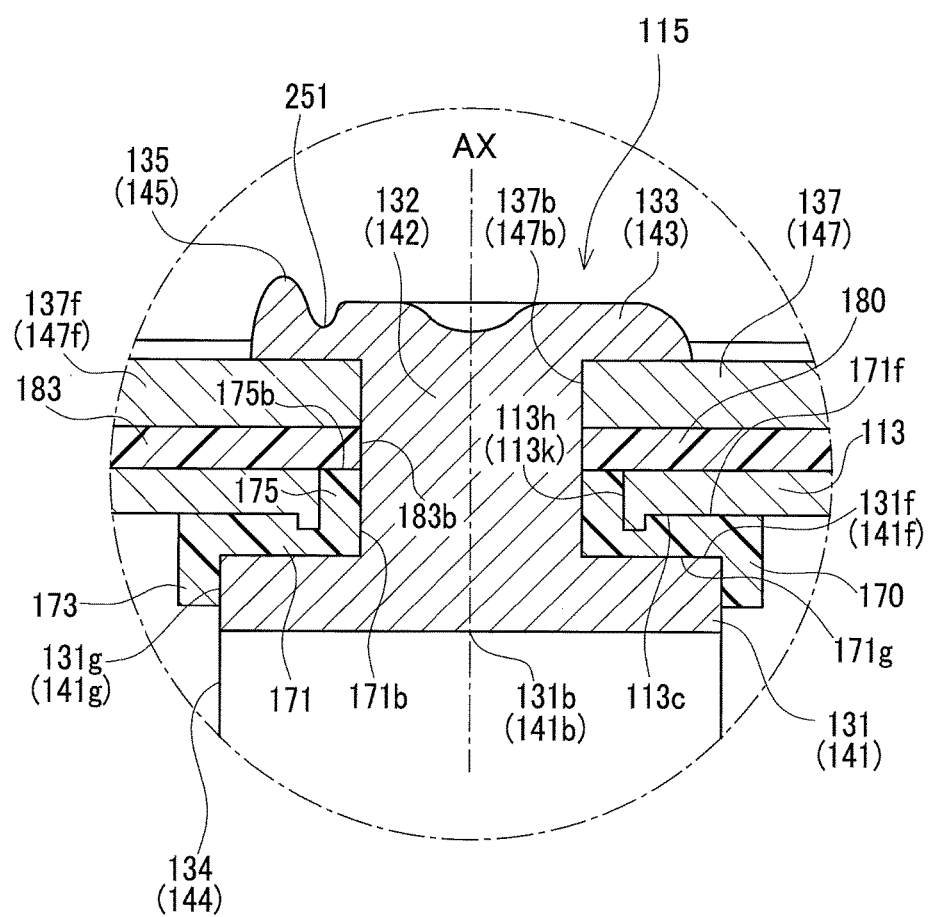
FIG. 6 is an explanatory view showing a deformed part having a raised portion on an outer periphery.

FIGS. 1 to 3 of the present embodiment show the deformed part 133 having the upper surface smoothly formed in a nearly circular disk shape. However, for example, a stepped shape shown in FIG. 6 may be adopted in which a recess 251 is formed in a part slightly inward than the outer periphery of the upper surface, and a portion raised more upward than the inside of the recess 251 is formed more outside than the recess 251. This shape may be obtained particularly when the deforming step is carried out using a rotary caulking device.

REFERENCE SIGNS LIST

100 Battery
110 Battery case
111d Opening
113 Case lid
132 Insert-through part
133 Deformed part
134 Collector body
135 Positive collector terminal member
150 Electrode body
180 Insulator
223 Protrusion
231 Sealing part
241, 243 Gap
245 Spacer part

The invention claimed is:

1. A battery comprising:
a power generating element;
a case having an opening and enclosing the power generating element;
a lid member welded to the opening of the case to close the opening;
a collector terminal member including a collector head portion having one end electrically connected to the power generating element and the other end facing the lid member, and an insert-through part having one end electrically connected to the collector head portion and the other end penetrating through the lid member in a vertical direction corresponding to a thickness direction of the lid member to extend out of the lid member, and a deformed part extended radially by deforming the other end of the insert-through part and electrically connected to an outer connecting terminal;
an insulator placed in contact with an upper surface of the lid member to electrically insulate the lid member and the collector terminal member; and
a gasket placed in contact with a lower surface of the lid member to seal between the lid member and the collector terminal member, wherein
the lid member includes a protrusion protruding downward from a lower surface of the lid member in the vertical direction;
the gasket includes a sealing part located in the same position as the protrusion of the lid member in an inside-outside direction perpendicular to the vertical direction, the sealing part being in pressure contact with the protrusion;
an upper surface of the collector head portion is formed with a recess, and the upper surface of the recess comprises a tapered surface and a horizontal surface continuous with the outside of the tapered surface, the horizontal surface is a surface perpendicular to the vertical direction, and
a gap is formed between the recess and the lower surface of the gasket.

2. The battery according to claim 1, wherein
the insert-through part of the collector terminal member has a columnar shape, and
the gasket interposed between the insulator and the insert-through part of the collector terminal member is placed over an entire outer circumference of the insert-through part of the collector terminal member.

3. A battery including:
a power generating element;
a case having an opening and enclosing the power generating element;
a lid member welded to the opening of the case to close the opening;
a collector terminal member including a collector head portion having one end electrically connected to the power generating element and the other end facing the lid member, and an insert-through part having one end electrically connected to the collector head portion and the other end penetrating through the lid member in a vertical direction corresponding to a thickness direction of the lid member to extend out of the lid member, and a deformed part extended radially by deforming the other end of the insert-through part and electrically connected to an outer connecting terminal;
an insulator placed in contact with an upper surface of the lid member to electrically insulate the lid member and the collector terminal member; and
a gasket placed in contact with a lower surface of the lid member to seal between the lid member and the collector terminal member, wherein
the lid member includes a protrusion protruding downward from a lower surface of the lid member in the vertical direction;
the gasket includes a sealing part located in the same position as the protrusion of the lid member in an inside-outside direction perpendicular to the vertical direction, the sealing part being in pressure contact with the protrusion;
an inner burring portion of the gasket is interposed between a through hole of the lid member and the insert-through part, and the insulator is placed above the inner burring portion of the gasket, and
a gap is formed among the inner burring portion of the gasket, the insulator and the insert-through part.

4. The battery according to claim 3, wherein the gap is interposed on a side closer to the insert-through part than the sealing part in the inside-outside direction and between the insulator and the insert-through part of the collector terminal member.

5. The battery according to claim 4, wherein
the gasket fills between the lid member and the collector terminal member in the inside-outside direction and is interposed between the insulator and the insert-through part of the collector terminal member, and
the gap interposed between the insulator and the insert-through part of the collector terminal member is located above the gasket interposed between the insulator and the insert-through part of the collector terminal member.

6. The battery according to claim 5, wherein
the insert-through part of the collector terminal member has a columnar shape, and
the gasket interposed between the insulator and the insert-through part of the collector terminal member is placed over an entire outer circumference of the insert-through part of the collector terminal member.

* * * * *